(12) United States Patent
Dobson et al.

(10) Patent No.: US 9,197,672 B2
(45) Date of Patent: Nov. 24, 2015

(54) METHOD AND SYSTEM FOR SELECTIVE APPLICATION OF DEVICE POLICIES

(71) Applicant: OpenPeak Inc., Boca Raton, FL (US)

(72) Inventors: Andrew James Dobson, Wellington, FL (US); David Medina, Miami, FL (US)

(73) Assignee: OPENPEAK INC., Boca Raton, FL (US)

(*) Notice: Subject to any disclaimer, the term of this patent is extended or adjusted under 35 U.S.C. 154(b) by 22 days.

(21) Appl. No.: 14/325,943

(22) Filed: Jul. 8, 2014

(65) Prior Publication Data

US 2015/0082374 A1   Mar. 19, 2015

Related U.S. Application Data

(60) Provisional application No. 61/843,515, filed on Jul. 8, 2013.

(51) Int. Cl.
| | |
|---|---|
| *H04L 29/06* | (2006.01) |
| *H04L 12/58* | (2006.01) |
| *G06F 21/53* | (2013.01) |
| *H04W 12/08* | (2009.01) |
| *G06F 21/62* | (2013.01) |

(52) U.S. Cl.
CPC ............... *H04L 63/20* (2013.01); *G06F 21/53* (2013.01); *G06F 21/6281* (2013.01); *H04L 51/04* (2013.01); *H04W 12/08* (2013.01)

(58) Field of Classification Search
CPC ......... H04L 63/20; H04L 51/04; G06F 21/53; G06F 21/6281; H04W 12/08
USPC .............................................. 726/1
See application file for complete search history.

(56) References Cited

U.S. PATENT DOCUMENTS

| | | | |
|---|---|---|---|
| 8,978,110 B2 | 3/2015 | Dabbiere et al. | |
| 2004/0014423 A1† | 1/2004 | Croome | |
| 2008/0244693 A1 | 10/2008 | Chang | |
| 2010/0217853 A1† | 8/2010 | Alexander | |
| 2012/0192205 A1 | 7/2012 | Bhasin et al. | |
| 2012/0198515 A1* | 8/2012 | Bennett | H04L 63/104 726/1 |
| 2012/0215923 A1† | 8/2012 | Mohindra | |
| 2013/0014212 A1 | 1/2013 | Cohen | |
| 2013/0046832 A1 | 2/2013 | Wideman | |
| 2014/0108794 A1* | 4/2014 | Barton | G06F 21/6218 713/165 |

OTHER PUBLICATIONS

International Search Report and Written Opinion for International Application No. PCT/US2014/045742, mailed Jun. 29, 2015, 13 pages.

* cited by examiner
† cited by third party

*Primary Examiner* — Michael S McNally

(57) ABSTRACT

A method and system for selective application of device policies are described herein. The method can include the step of receiving one or more policies from a messaging server in which the policies are intended to be indiscriminately applied to a computing device. Out of the received policies, one or more container policies that are to be applied to a container of the computing device can be identified. The identified container policies can be applied to the container such that the identified container policies may be prevented from being indiscriminately applied to the computing device.

13 Claims, 3 Drawing Sheets

METHOD AND SYSTEM FOR SELECTIVE APPLICATION OF DEVICE POLICIES

CROSS-REFERENCE TO RELATED APPLICATIONS

This patent application claims priority to U.S. Patent Application No. 61/843,515, filed on Jul. 8, 2013, which is incorporated herein by reference in its entirety.

FIELD OF TECHNOLOGY

The present description relates to systems and methods for the application and enforcement of policies and more particularly, for the application and enforcement of such policies against a container of a portable computing device.

BACKGROUND

Most mobile devices are equipped to facilitate the exchange of messages between the device and a messaging server. For example, many mobile devices support Exchange Active Sync (EAS), a protocol designed by Microsoft Corp. of Redmond, Wash. for the synchronization of email, contacts, calendar events and tasks. More recent versions of EAS are configured to enforce certain security policies against a mobile device that employs EAS. Some examples of these policies include requirements for a password and a minimum password length and a timeout without user input.

These policies are enforced against the entire mobile device that uses EAS such that the mobile device is managed by these policies. In particular, the EAS password requirement, when enabled, requires a user to enter a password prior to any use of the mobile device. This indiscriminate application of policies against the mobile device is inefficient and may interfere with certain configurations that may be set up on the device.

SUMMARY

A method for selective application of device policies is described herein. The method can include the step of receiving one or more policies from a messaging server in which the policies are intended to be indiscriminately applied to a computing device. Out of the received policies, one or more container policies that are to be applied to a container of the computing device can be identified. The identified container policies can be applied to the container such that the identified container policies are prevented from being indiscriminately applied to the computing device.

As an example, the container may be a secure container that includes one or more secure applications. In addition, identifying one or more container policies includes receiving from a management server instructions for the selection of the policies from the messaging server that are to be applied to the container of the computing device. As another example, applying the identified container policies to the container can include applying at least a portion of the identified container policies only when the container is active. The method can also include the steps of deactivating the applied identified container policies when the container is no longer active and returning any pre-existing policies that were in place prior to the container becoming active.

In another arrangement, the method can include the step of confirming with the messaging server application of the received policies as originally intended even though at least some of the received policies may not be applied according to design. This feature may ensure compliance with any relevant requirements associated with the use of the messaging service. In one particular example, the messaging server is an email server, and the policies are policies that may be associated with the email server. The method can also include the step of storing the container policies in a shared memory element that is accessible only by the secure applications. In addition, the received policies that are intended to be indiscriminately applied to a computing device are intended to be applied to the computing device without any regard to the container of the computing device or other restricted workspaces of the computing device.

Another method for selective application of device policies is described herein. The method can include the step of receiving one or more policies from a message server in which the policies are intended to be indiscriminately applied to a computing device. Out of the received policies, one or more container policies that are to be applied to a secure container of the computing device can be identified. The identified container policies can be applied to the secure container such that the identified container policies are prevented from being indiscriminately applied to the computing device. The method can also include the step of providing confirmation to the message server that the received policies were applied as originally intended. This confirmation can ensure compliance with requirements that may be associated with the message server. As an example, the message server can be an email server and the computing device is a mobile computing device. In one arrangement, applying the identified container policies to the secure container can include applying the identified container policies to the secure container only when the secure container is active.

There are many examples of the received policies. Some of them include one or more of the following: (1) minimum password length; (2) number of failed attempts; (3) require alpha-numeric password; (4) enable downloads of attachments to messages; (5) maximum attachment size; (6) enable password recovery; (7) password expiration; (8) enforce password history; (9) encryption requirements; (10) disable syncing of certain features; (11) disable hardware components, like cameras, Wi-Fi, Bluetooth, IrDA ad removable storage; (12) disable SMS/MMS messaging; (13) allow Internet or desktop sharing from device; (14) disable POP3/IMAP4 email; (15) allow consumer email; (16) allow web browser; (17) allow unsigned applications or CAB files; (18) whitelisting or blacklisting of applications; (19) require signed or encrypted S/MIME messages or algorithms; (20) allow S/MIME encrypted algorithm negotiations or S/MIME SoftCerts; (21) minimum number of complex characters; (22) configure message formats; (23) include past email or message items; (24) message body truncation size; (25) include past calendar items; (26) require manual sync when roaming; (27) allow mobile OTA updates and mode; or (28) allow individual rights management.

A system for selective application of policies on a computing device is also described herein. The system can include an interface that can be configured to receive one or more policies from a messaging server in which the policies are intended to be indiscriminately applied to the computing device. The system can also include a messaging engine that can be configured to confirm with the messaging server the application of the received policies to the computing device with the messaging server. A management engine may also be part of the system. The management engine may be configured to selectively apply at least some of the received policies to a container of the computing device such that the policies applied to the container are prevented from being indiscriminately applied to the computing device. As an example, the container can be a secure container that includes one or more secure applications.

The management engine can be further configured to apply the received policies to the container when the container is active and to confirm application of the received policies to the computing device irrespective of whether all the received policies were actually applied to the computing device. In another arrangement, the management engine can be further configured to deactivate the received policies that have been applied to the container when the container is no longer active and re-establish any pre-existing policies that were in place prior to the container becoming active.

As an example, the received policies that are applied to the container include a personal identification number requirement to access the container and a screen lock requirement. Moreover, the management engine can be configured to selectively apply the received policies to the container by selectively applying the received policies to applications that are part of the container.

Further features and advantages, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
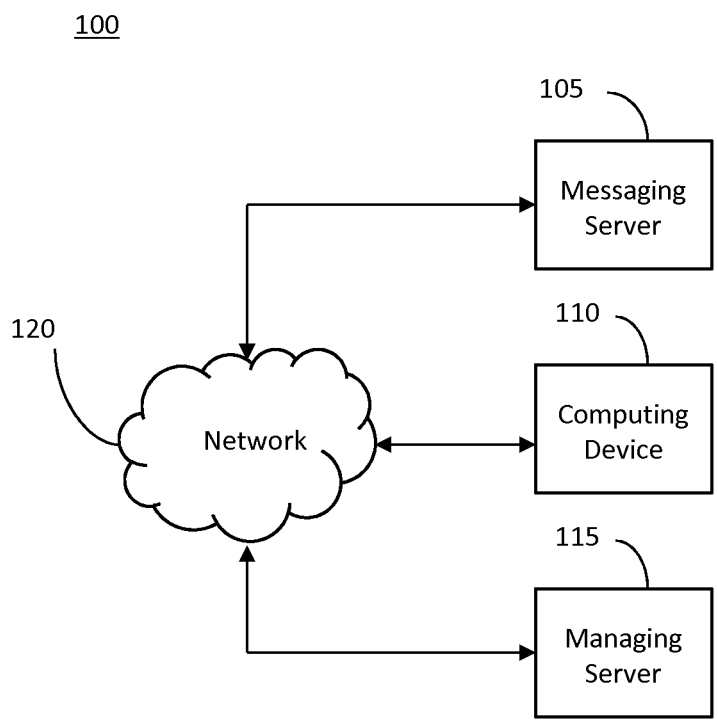
FIG. 1 illustrates an example of a system for selective application of device policies.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected (directly or indirectly) such that communication signals are able to be exchanged between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The terms "computer program medium" and "computer readable medium" are defined as one or more components that are configured to store instructions that are to be executed by a processing unit or some other component.

An "application" is defined as a program or programs that perform one or more particular tasks on a computing device. Examples of an application include programs that may present a user interface for interaction with a user or that may run in the background of an operating environment and that may not present a user interface while in the background. The term "secure application" is defined as an application that has been modified from its original form to restrict communications between the application and unauthorized programs, applications or devices and to restrict operation of the application based on policy or to alter, augment or add features associated with the operation of the application (or any combination thereof). A "target application" is defined as an application that has been selected for conversion into a secure application. An "unsecure application" or "non-secure application" is defined as an application that has not undergone the modification required to convert the application into a secure application and, as such, is unable to obtain data from a secure application in accordance with the namespacing scheme employed by that secure application. The term "secure framework" is defined as a framework that is configured to encapsulate a secure application by at least preventing the secure application from processing requests from a non-secure application. The term "operating system" is defined as a collection of software components that directs a computing device's operations, including controlling and scheduling the execution of other programs and managing storage, input/output and communication resources.

A "processing unit" is defined as one or more components that execute sets of instructions, and the components may be disparate parts or part of a whole unit and may not necessarily be located in the same physical location. The term "memory" or "memory element" is defined as one or more components that are configured to store data, either on a temporary or persistent basis. An "interface" is defined as a component or a group of components that enable(s) a device to communicate with one or more different devices, whether through hard-wired connections, wireless connections or a combination of both. A "transceiver" is defined as a component or a group of components that transmit signals, receive signals or transmit and receive signals, whether wirelessly or through a hard-wired connection or both.

A "policy" is defined as one or more settings, configurations, parameters or instructions for causing a computing device to take or avoid taking one or more actions. The term "messaging server" is defined as a server that is configured to facilitate, manage or conduct the exchange of messages between any number of computing devices. A "container" is defined as a configuration or arrangement of a computing device in which access to certain applications, features or data is restricted or otherwise managed. The term "container policy" is defined as a policy that is configured to be applied to a container, as opposed to an entire computing device on which the container is established.

As explained earlier, some messaging protocols facilitate the application of security policies against a mobile device. Adherence to such an arrangement, however, may interfere with an efficient operation of the device, particularly where the device is configured to separate enterprise applications and data from personal material of the user that is on the device.

As a solution, a method for selective application of device policies is presented herein. The method can include the step of receiving one or more policies from a messaging server in which the policies are intended to be indiscriminately applied to a computing device. Out of the received policies, one or more container policies that are to be applied to a container of the computing device can be identified. As an example, the container may be a secure container that is associated with managing sensitive information. The identified container policies can be applied to the container such that the identified container policies may be prevented from being indiscriminately applied to the computing device.

Thus, policies that are associated with a messaging service may be applied to a computing device but in a way that provides for more efficient operation of the device. For example, certain security policies set by the messaging service may be limited to enforcement against a secure container, as opposed to the entire device, which would affect the personal aspects of the user of the device.

Referring to FIG. 1, a system 100 that can facilitate the principles described herein is shown. In one arrangement, the system 100 can include one or more messaging servers 105, one or more computing devices 110 and one or more managing servers 115. The messaging server 105 may be responsible for facilitating the exchange of messages between the computing device 110 and any other number of components or systems. As an example, the messaging server 105 may be operated by an email service and can manage email exchange for the computing device 110. The managing server 115 may be operated or be under the control of an enterprise that may wish to enforce several policies against the computing device 110. The computing device 110 may be owned or at least operated by someone associated with the enterprise, such as an employee of the enterprise. The enterprise may be able to apply these policies against the computing device 110 through the managing server 115. As an example, the computing device 110 may be a mobile device, although such a configuration is not necessary. In one particular arrangement, the entity that controls or operates the managing server 115 may have no affiliation with or control over the messaging server 105 and the policies that are associated with the messaging server 115.

One or more networks 120 may also be part of the system 100 to enable the computing device 105 to communicate with the messaging server 115 and the managing server 115. If necessary, the messaging server 105 and the managing server 115 may also communicate with one another through the network 120. To be sure, the network 120 can be any suitable combination of networks and communication devices to enable such communications, including local or wide area and wired or wireless communications.

In one arrangement, the messaging server 105 may be configured to apply certain policies against the computing device 110. Some of these policies may be security policies, like implementing a screen lock and a screen time-out feature on the computing device 110. In a conventional setting, the policies from the messaging server 105 are intended to be indiscriminately applied to the computing device 110, which means that the application of the policies does not account for the installation of containers or other forms of data segregation on the computing device 110.

Figure 2:
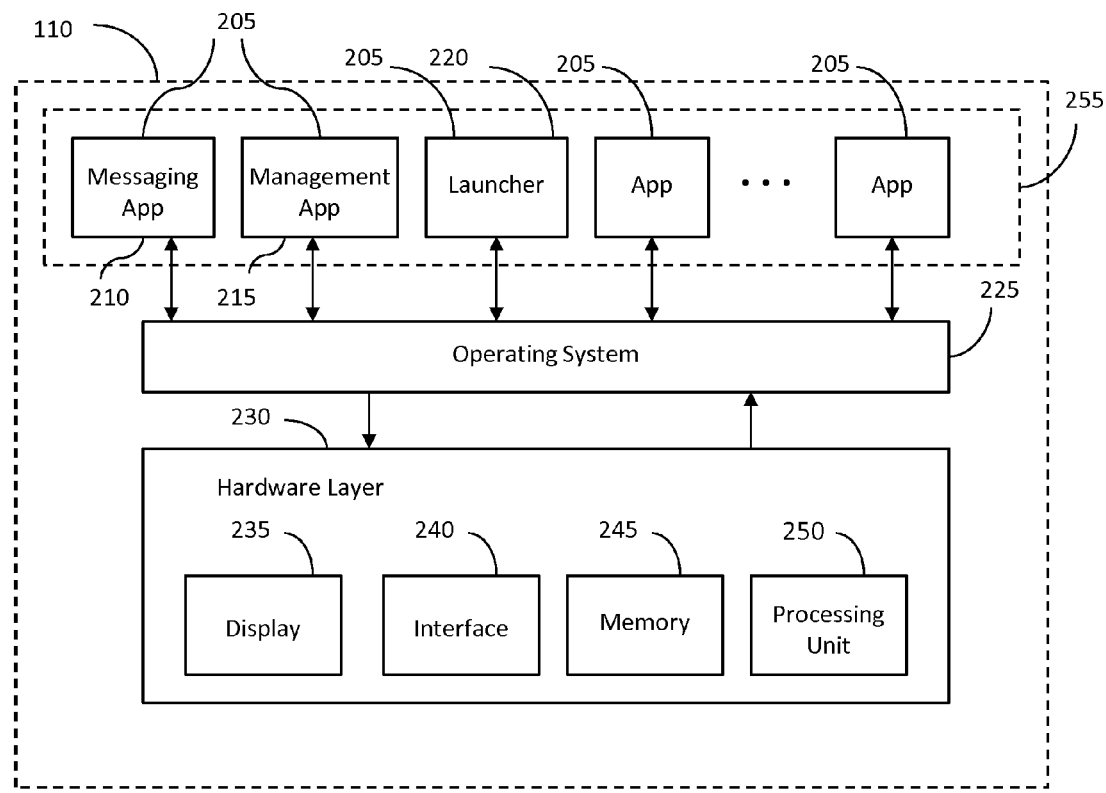
FIG. 2 illustrates an example of a block diagram of a computing device that can be part of the system of FIG. 1.

Referring to FIG. 2, an example of a block diagram of the computing device 110 is shown. The computing device 110 can include a number of applications 205, one of which may be a messaging application 210, one of which may be a management application 215 and one of which may be a launcher 220. The device 110 may also include an operating system 225, which can oversee the operations of the device, and a hardware layer 230. Other abstraction layers and libraries, although not pictured here, may also form part of the computing device 110, particularly those that are involved in the operation of mobile devices. Some examples of components that may be part of the hardware layer include one or more displays 235, one or more interfaces 240, memory 245 and one or more processing units 250. In particular, the interfaces 240 can be configured to permit the computing device 110 to communicate with other computing devices and networks, both over wired and wireless media. Any suitable type of memory 245 can be part of the device 110, including both persistent and temporary storage units, both fixed and removable. Although not shown here, other conventional hardware components may form part of the hardware layer, as the computing device 110 is not limited to those illustrated here.

In one arrangement, the messaging application 210 may be configured to serve as an interface to enable a user of the computing device 110 to exchange messages and engage in communications with one or more other users. As an example, the messaging application 210 may be an email application, although other forms of messaging using other applications 205 may be supported by the computing device 110. To enable such messaging, the messaging application 210 may be registered with and supported by the messaging server 105 of the system 100.

In another arrangement, the management application 215 may be configured to enable the enforcement or application of certain policies against the computing device 110, certain hardware components of the device 110 or the applications 205 installed on the device 110. To carry out such policies, the management application 215 may communicate with and be supported by the managing server 115 of the system 100.

In one embodiment, the computing device 110 may include a container 255, which may also be referred to as a secure container. In particular, at least some of the applications 205 may be secure applications 205, and the secure applications 205 may be part of the container 255. Secure applications are conventional applications that have been modified to support the policies and protect the data of an enterprise or organization that has some association with the user of the computing device 110. For example, a secure 205 application may be configured to encrypt data that it writes to storage or to block certain features based on a current location in which the computing device 110 is operating. As another example, through namespace enforcement and other techniques, non-secure applications may be restricted from exchanging data with or otherwise accessing the secure applications 205 installed on the device. Additional information on this arrangement, including how secure applications may be created, can be found in U.S. Pat. No. 8,695,060 issued on Apr. 8, 2014, which is incorporated by reference herein in its entirety (to the extent that there are any conflicts with defined terms in this application and those of the incorporated '060 patent, the terms of this application take precedence). As mentioned above, the management application 215 can be used to manage the implementation/execution of these policies.

To access the container 255 and, hence, the secure applications 205, a user of the computing device 110 may be required to provide some sort of authentication information, such as a personal identification number (PIN). The launcher 220 can oversee this process, and can permit access to the secure applications 205 once the user has provided the proper authentication. As an example, this PIN requirement may be implemented by the managing server 115 and the management application 215, although this policy can be set in place in accordance with other arrangements, as will be explained below.

In one embodiment, the messaging application 205, the processing unit 250 and any other intermediate layers may form a messaging engine, which can be used to facilitate the exchange of messages with the messaging server 105 and to carry out other functions, as will be explained below. Similarly, the management application 215, the processing unit 250 and any other intermediate layers may form a management engine. The management engine may work with the managing server 115 to apply certain policies against the computing device 110, as will be explained below.

Figure 3:
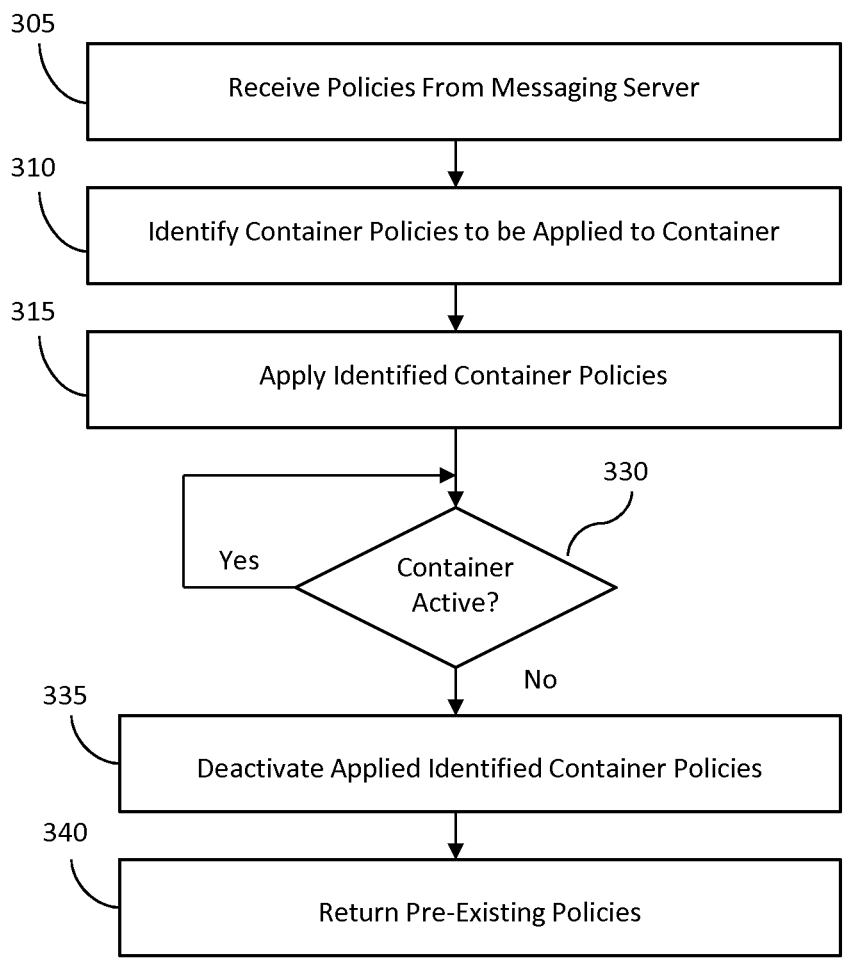
FIG. 3 illustrates an example of a method for selective application of device policies.

Referring to FIG. 3, an example of a method 300 for selective application of device policies is shown. It is important to note that the method 300 may include additional or even fewer steps or processes in comparison to what is illustrated in FIG. 3. Moreover, the method 300 is not necessarily limited to the chronological order that is shown in FIG. 3. In describing the method 300, reference may be made to FIGS. 1 and 2, although it is understood that the method 300 may be practiced with any other suitable systems and components.

At step 305, one or more policies can be received from a messaging server, and these policies may be intended to be indiscriminately applied to a computing device. At step 310, out of the received policies, one or more identified container policies that are to be applied to a container of the computing device can be identified. The identified container policies can be applied to the container, as shown at step 315. At decision block 320, it can be determined whether the container of the computing device is still active. If not, the applied identified container policies can be deactivated, as shown at step 335. At step 340, any pre-existing policies that were in place prior to the container becoming active can be returned.

For example, the messaging server 105 may be configured to cause a number of policies, some of which may be security policies, to be applied to the computing device 110. These policies may be intended to be indiscriminately applied to the computing device 110, meaning that the policies are designed to be applied to the entire computing device 110 without regard to any containers or other segmented, segregated, isolated or restricted work spaces. When the messaging application 210 is registered with the messaging server 105, the messaging server 105 can send a number of policies to the computing device 110, which can be received by the interface 240.

The messaging application 210 may receive these policies, but the messaging application 210 may be configured to avoid applying the policies to the computing device 110, at least temporarily. For example, the messaging application 210 may determine from the management application 215 which of the received policies are to be applied to the computing device 110, just the container 255 of the device 110 or not at all. If any of the policies are not to be applied at all, then the messaging application 210 may ignore them. If any of the policies are to be applied to the computing device 110 as a whole, then the messaging application 210 may take such conventional action. If any of the policies are to be restricted to the container 255, however, the messaging application 210 may acknowledge this arrangement. In either case, the messaging application 210 may be configured to confirm application of the received policies to the computing device 110 with the messaging server 105. That is, the messaging server 105 may receive confirmation of the application of the policies as originally intended, even though at least some of them may not be applied according to design.

As mentioned earlier, the management application 215 may be responsible for applying certain policies against the computing device 110, the container 255 or the applications 205, which may be mandated by the managing server 115. In some cases, the policies from the managing server 115 may take precedence over the policies from the messaging server 115. The messaging application 210 may determine such an arrangement from the management application 215, and can simply ignore the relevant policies from the messaging server 105. To accommodate the protocol established by the messaging server 105, however, the messaging application 210 can inform the messaging server 105 that the policies delivered by the messaging server 105 have been applied to the computing device 110, as described above.

In one arrangement, the managing server 115 may be configured to enable the entity in control of the managing server 115 (or some other party) to determine which policies are to be applied to the computing device 110, those associated with the messaging server 105 or those with the managing server 115. The entity may choose to only apply the policies of the messaging server 105, to only apply the policies of the managing server 115 or a combination of the two. In either case, the messaging application 210 can determine from the management application 215 which policies are to be applied and can instruct the messaging server 105 that its policies have been applied to the computing device 110.

The option of selecting policies associated with the messaging server 105 can enable policies that have been previously set up through the server 105 to be applied. This may be a convenience to a party because that party may not be required to set up the same policies with respect to the managing server 115 each time a new bundle of content is delivered to the computing device 110.

As noted earlier, the policies associated with the messaging server 105 may be selectively applied, such as limiting their application to the container 255 of the computing device 110. This selective administration of the policies may also be directed to the secure applications 205 that may be part of the container 255. That is, one or more of the policies of the messaging server 105 may only be applied to the container 255, the secure applications 205 or both. Several examples will now be presented.

Consider the scenario where there are several security policies associated with the messaging server 105, such as one that requires a PIN to be entered to gain access to the container 255 and the secure applications 205 (and/or other secure content) on the computing device 110. Another example of a security policy associated with the messaging server 105 is a screen lock, which will lock access to the features of the computing device 110 following the lack of detection of user activity after a predetermined time. In this example, the entity in control may elect to not apply any remaining policies of the messaging server 105 or any of the policies associated with the managing server 115.

The messaging application 210 can then determine from the management application 215 which policies are to be applied and can inform the messaging server 105 that its policies have been applied, as described above. The messaging application 210 can also inform the launcher 220 of the PIN requirement, and the launcher 220 can take steps to enforce that requirement. For example, if a user attempts to access the container 255 or an application 205 of the container 255, the user may be required to provide an authorized PIN before being given such access. Again, this PIN-requirement policy may be limited to the container 255 or the applications 205 of the container 255, as opposed to the entire computing device 110. Thus, a user may freely access personal content on the computing device 110 without having to enter the PIN, but secure content may still be protected by the PIN requirement.

Concerning the screen lock policy, the management application 215 may selectively apply this policy. For example, the policy originally set by the messaging server 105 may call for a one-minute time frame, after which the features of the computing device 110 are locked until authentication information (e.g., a PIN) is provided. Because this policy is to be implemented, the management application 215 may instruct the operating system 225 to execute the screen lock procedure when the container 255 or an application 205 of the container 255 is active. Thus, for example, if a user has accessed the container 255 or is otherwise operating an application 205 of the container 255 or working with secure content, the screen lock may be applied.

In one arrangement, if the container 255 has been deactivated, or is no longer being used by the user, the management application 215 may instruct the operating system 225 to remove the screen lock requirement. This removal may also apply if the user simply closes an application 205 of the container 255 or other secure content. In addition, if a similar pre-existing policy was in place prior to the establishment of the current screen lock policy, that pre-existing policy may be returned. For example, the user may wish to have no screen lock or one with a longer predetermined time frame when accessing personal (i.e., non-secure) content. Thus, when the user moves away from the container 255 or a secure application 205 to personal content, the screen lock in place prior to accessing the secure content can be re-established. This re-establishment of settings once a user leaves the container 255 or closes a secure application 205 may apply to any other policy, including the PIN requirement.

It is understood that there are any number of policies associated with the messaging server 105 that may be selectively applied to the computing device 110 in accordance with the discussion above. Some exemplary policies that may be so applied include one or more of the following: (1) minimum password length; (2) number of failed attempts; (3) require alpha-numeric password; (4) enable downloads of attachments to messages; (5) maximum attachment size; (6) enable password recovery; (7) password expiration; (8) enforce password history; (9) encryption requirements; (10) disable syncing of certain features; (11) disable hardware components, like cameras, Wi-Fi, Bluetooth, IrDA ad removable storage; (12) disable SMS/MMS messaging; (13) allow Internet or desktop sharing from device; (14) disable POP3/IMAP4 email; (15) allow consumer email; (16) allow web browser; (17) allow unsigned applications or CAB files; (18) whitelisting or blacklisting of applications; (19) require signed or encrypted S/MIME messages or algorithms; (20) allow S/MIME encrypted algorithm negotiations or S/MIME SoftCerts; (21) minimum number of complex characters; (22) configure message formats (e.g., HTML or plain text); (23) include past email or message items (duration); (24) message body truncation size; (25) include past calendar items (duration); (26) require manual sync when roaming; (27) allow mobile OTA updates and mode; or (28) allow individual rights management. Of course, this listing is not meant to be exhaustive, as other policies may be enforced according to this scheme. It must also be noted that either of the messaging application 210, the management application 215, the messaging engine or the management engine may be responsible for implementing or facilitating the implementation of these policies.

In one arrangement, the policies that are associated with the messaging server 105 and that are to be applied to secure applications 205 may be stored in a shared memory element. For example, some secure applications 205 may be able to access a paste memory element, like a pasteboard, to determine which policies should be applied to them. As is known in the art, a virtual file system (VFS) may be part of the computing device 110 to assist in this process. In addition, the shared memory element may only be accessible by the secure applications 205. Additional information on a VFS and a shared memory element in a secure environment is presented in U.S. patent application Ser. No. 13/942,042, filed on Jul. 15, 2013, which is incorporated by reference herein in its entirety (to the extent that there are any conflicts with defined terms in this application and those of the incorporated '042 patent application, the terms of this application take precedence).

Although the computing device 110 is described above as having a secure container 255 and secure applications 205, such an arrangement is not necessary. That is, the principles described herein may also be applicable to a computing device 110 that includes only conventional (i.e., non-secure) applications and a non-secure container.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method for selective application of device policies, comprising:
    receiving one or more policies from a messaging server, wherein the policies are intended to be indiscriminately applied to a computing device;
    out of the received policies, identifying one or more container policies that are to be applied to a container of the computing device;
    applying the identified container policies to the container;
    wherein the identified container policies are prevented from being indiscriminately applied to the computing device;
    wherein applying the identified container policies to the container comprises applying at least a portion of the identified container policies only when the container is active;
    deactivating the applied identified container policies when the container is no longer active; and
    returning any pre-existing policies that were in place prior to the container becoming active.

2. The method according to claim 1, wherein the container is a secure container that includes one or more secure applications.

3. The method according to claim 2, further comprising storing the container policies in a shared memory element that is accessible only by the secure applications.

4. The method according to claim 1, wherein identifying one or more container policies comprises receiving from a management server instructions for the selection of the policies from the messaging server that are to be applied to the container of the computing device.

5. The method according to claim 1, further comprising confirming with the messaging server application of the received policies as originally intended even though at least some of the received policies may not be applied according to design.

6. The method according to claim 1, wherein the messaging server is an email server and the policies are policies that are associated with the email server.

7. The method according to claim 1, wherein the received policies that are intended to be indiscriminately applied to a computing device are intended to be applied to the computing device without any regard to the container of the computing device or other restricted workspaces of the computing device.

8. A system for selective application of policies on a computing device, comprising:
    an interface that is configured to receive one or more policies from a messaging server, wherein the policies are intended to be indiscriminately applied to the computing device;
    a messaging engine that is configured to confirm with the messaging server the application of the received policies to the computing device; and
    a management engine that is configured to selectively apply at least some of the received policies to a container of the computing device such that the policies applied to the container are prevented from being indiscriminately applied to the computing device;
    wherein the received policies that are applied to the container include a personal identification number requirement to access the container and a screen lock requirement.

9. The system according to claim 8, wherein the management engine is further configured to apply the received policies to the container when the container is active.

10. The system according to claim 8, wherein the messaging engine is further configured to confirm application of the received policies to the computing device irrespective of whether all the received policies were actually applied to the computing device.

11. The system according to claim 8, wherein the container is a secure container that includes one or more secure applications.

12. The system according to claim 8, wherein the management engine is further configured to:
    deactivate the received policies that have been applied to the container when the container is no longer active; and
    re-establish any pre-existing policies that were in place prior to the container becoming active.

13. The system according to claim 8, wherein the management engine is configured to selectively apply the received policies to the container by selectively applying the received policies to applications that are part of the container.

* * * * *